United States Patent Office 2,750,522
Patented June 12, 1956

2,750,522

METHOD OF MAGNETIZING TWO-SECTION PERMANENT MAGNET ALTERNATORS

George Seiden, Bronx, N. Y., assignor to Eastern Air Devices, Inc., Brooklyn, N. Y., a corporation of New York Application December 9, 1953, Serial No. 397,225

23 Claims. (Cl. 310—152)

The present invention relates to a method of magnetizing the permanent magnets in two-section permanent magnet alternators, particularly such alternators in which the individual sections are provided with a different number of poles so that they have outputs of different frequencies, so as to obtain distortion-free outputs having a predetermined phase relationship without having to adjust any of the alternator structure.

Alternators of the type under discussion usually comprise a pair of stators, one for each alternator section and each including pole pieces and coils within which a permanently magnetizable rotor revolves, the rotor having two sections each revolving within a corresponding stator and being individually magnetized so as to correspond to the stator with which it cooperates and produce an electrical output in the stator coils thereof. Even when the two stators have the same number of poles, thus producing electrical outputs of the same frequency, a serious manufacturing problem is presented in producing a predetermined phase relationship between those outputs. If the outputs are to be in the same phase, and if the two rotor sections are identical, with their magnetic poles accurately aligned, the relative rotative positions of the stators within the frame of the motor must also be identically rotatively aligned if the desired output phase relationship is to be attained. This, in mass production, is very difficult.

When, as is the more usual situation, the two stators have a different number of poles, so that the output from the two alternator sections will have different frequencies, the problem is materially intensified because each rotor section cooperating with a particular stator must be individually magnetized to have the same number of magnetic poles as the stator with which it cooperates. This makes it impossible, from a practical production-line point of view, to produce identical rotors for a series of alternators, and hence, on a production basis, one cannot pre-align the stators in the alternator frame in any predetermined manner in order to give rise to the desired output phase relationship. Adjustments of the relative positions of the stators within each individual alternator frame have therefor been required if the desired phase relationship is to be obtained. It will be appreciated that when individual attention and adjustment is required for each unit, cost is materially increased and productivity is materially decreased.

The above discussion has reference only to phase relationship between outputs. With rotor pre-magnetization significant problems also arise with respect to distortion of the individual outputs, even in single-section alternators. Ross Patent 2,529,049 of November 7, 1950, entitled "Method of Magnetizing Permanent Magnet Rotors," and assigned to the assignee of the instant invention, discloses a method for magnetizing rotors in place in the single-section machine in which they are to be used, this method having proved to be of great advantage in giving rise to a substantially distortionless alternating current output. The advantages of this method of magnetization have suggested its employment in the magnetization of the rotor section of two-section alternators, but the difficulties involved in producing such alternators on a commercial scale in which the outputs of the individual sections have a predetermined phase relationship effectively militated against its use until the method of the instant invention was devised.

According to the instant invention, the rotor of a two-section permanent magnet alternator is magnetized in the alternator in which it is to be employed in such a way, and according to the teachings of Ross Patent 2,529,049, that the output of each section is substantially distortionless, and at the same time the phases of those outputs are maintained at a predetermined relationship without having to mechanically align or adjust the individual stators, those stators being placed within the motor casing in a haphazard manner insofar as rotative alignment of their pole pieces is concerned. This result is accomplished by rotating the alternator to be magnetized, rotating the rotor of the alternator to be magnetized, hereinafter termed the "primary" alternator, by a driving motor which also rotates a reference alternator which is preferably of the same type as the primary alternator and in which the phase relationship of the outputs of its two sections is known, and is either the same as that desired in the primary alternator or differs therefrom by a predetermined and known amount. The driving motor is caused to rotate so as to drive the rotor of the reference alternator at a speed such as to cause the output of the first section thereof to have a predetermined frequency. The phase relationship between that frequency and a reference voltage, preferably having the same frequency, is determined. That section of the rotor of the primary alternator which cooperates with the first stator thereof, corresponding to the first section of the reference alternator, is then permanently magnetized by energizing the stator coils of said first primary alternator stator substantially in the manner disclosed in Ross Patent 2,529,049. After this magnetization has been carried out the driving motor is caused to rotate at a speed such that the voltage output of the second section of the reference alternator attains a predetermined frequency, that voltage output is compared with the reference voltage, and the phase relationship between them is determined. That phase relationship is then adjusted by rotatively shifting the rotor of the reference alternator in any appropriate manner while it is driven by the driving motor until the phase relationship obtained compares in a desired manner with the phase relationship previously observed between the reference voltage and the output of the first section of the reference alternator, and whatever rotative adjustments are made to the rotor of the reference alternator in order to accomplish this end are also made to the rotor of the primary alternator. Then the second section of the rotor of the primary alternator is permanently magnetized, again preferably by energizing the stator coils on the second primary alternator stator as taught by Ross.

In production work, where a comparatively large number of motors are produced the two sections of which are to have outputs all with the same phase relationship, it has been found desirable to include an additional step in the process. Instead of merely noting the phase relationship between the output of the first reference alternator section and the reference voltage, whatever it may be, and then bringing the output of the second section of the reference alternator into predetermined relationship thereto, the rotor of the reference alternator, while the phase of the output of its first section is being compared with the reference voltage, is rotatively shifted so that said output has a predetermined and easily detectable phase relationship with the reference voltage. This can well be done by feeding the alternator output and reference voltage to an oscilloscope and observing the screen thereof, changing Lissajous patterns appearing on that screen depending upon the phase relationships between the voltages. When, for example, the voltages have the same frequency and are in phase, a straight line at a 45 degree angle will appear on the screen. Then, when the output of the second section of the reference alternator is being detected, it, too, is fed to the oscilloscope and there compared with the reference voltage, the rotary position of the reference alternator rotor, and with it the primary alternator rotor, being shifted until the same straight line pattern is visible on the oscilloscope screen. This indicates that the outputs of the two sections of the reference alternator have the same phase relationship to the reference voltage at the time that magnetization of the individual sections of the primary alternator take place. Hence the outputs of the two sections of the primary alternator will have the same phase relationship as the outputs of the two sections of the reference alternator.

This refinement, in which the outputs of the two sections of the reference alternator as detected by the oscilloscope have the same phase relationship with respect to the reference voltage, is so desirable from a production point of view that it has proved to be a preferred procedure even when it is desired that the phase relationship between the outputs of the two sections of the primary alternator differ from those of the reference alternator. In order to employ this refinement in the latter situation, a phase shifting network of known characteristics is inserted between the oscilloscope and the output of one of the alternator sections, the phase shift produced by the network being such as to give rise to a desired phase shift between the indicated and actual outputs of that reference alternator section. Hence when the oscilloscope indicates that the outputs of the two reference alternator sections bear the same phase relationship to the reference voltage at the times when the rotor sections of the primary alternator are magnetized, actually the reference alternator outputs have a different phase relationship thereto. As a result the phase relation between the outputs of the primary alternator sections will differ from that between the reference alternator sections by the amount of phase shift imparted by said network.

The term "phase relationship," as here used, is applied not only to voltages or the like having the same frequencies, but also to voltages or the like of different frequencies, and to refer to the time relationship of their respective alternations.

The test setup here disclosed is so designed as to facilitate the checking of the outputs of the primary alternator both as to distortion and as to phase relationship, so as to indicate whether or not the described magnetizing procedure has been effective in a satisfactory manner.

It will be understood that by "magnetizing" the alternator is meant the production of residual magnetic poles on the surface of the permanent magnet rotor such that a desired frequency will be obtained from its corresponding stator. When a dual frequency alternator is involved, the sections of the rotor corresponding to the separate sections of the stator which produce the different frequencies must be differently magnetized, and with a different number of residual poles. In accordance with the present invention, the rotative relationship between the magnetic poles formed on one section of the rotor and the magnetic poles formed on the other section of the rotor is so related to the actual rotative position of the stator poles with which those rotor sections cooperate, whatever that rotative position may be, as to produce substantially distortionless outputs in predetermined phase relationship with one another.

To the accomplishment of the above, and to such other objects as may hereinafter appear, the present invention relates to the method of magnetizing a two-section permanent magnet alternator and checking the results of that method, as defined in the appended claims and as described in this specification, taken together with the accompanying drawings, in which:

Figure 2:
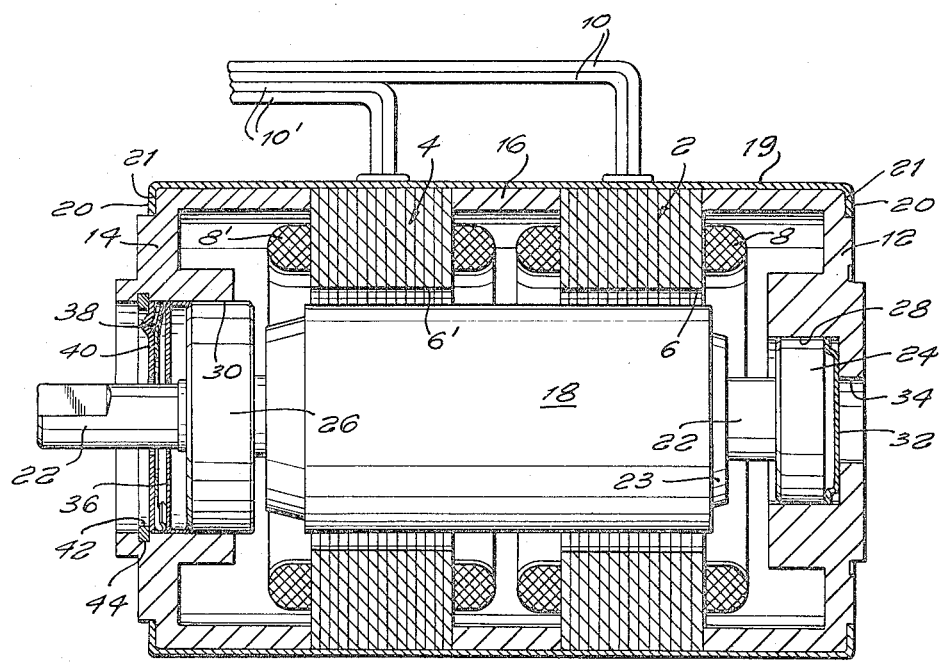
Fig. 2 is a cross sectional view of a typical alternator which might be magnetized according to the method of the present invention.

In order that the magnetizing method of the present invention be best understood, it appears appropriate first to describe a typical alternator in conjunction with which the present invention may be employed. That alternator (see Figs. 2 and 3) comprises a pair of stators 2 and 4, each consisting of a laminated magnetizable ring provided with pole pieces 6, 6' and with coils 8, 8' wound around their pole pieces, the leads 10, 10' to the coils 8 and 8' respectively passing to the exterior of the unit. The motor housing is defined by a rear end retaining cap 12, a front end retaining cap 14, a separating ring 16 between the stators 2 and 4, and a cover 19 having ends 20 spun over shoulders 21 formed on the rear and front retaining caps 12 and 14 respectively so as to hold the entire unit in assembled condition. The stator 2 is clamped between the rear end retaining cap 12 and the spacer ring 16, while the stator 4 is clamped between the front end retaining cap 14 and the spacer ring 16. The rotative relationship of the individual pole pieces 6 of the stators 2 and 4 need not be predetermined, in view of the magnetizing method hereinafter described in detail, and hence rotative alignment of the stators 2 and 4 is entirely unnecessary. This is an important advantage of the present invention.

Figure 3:
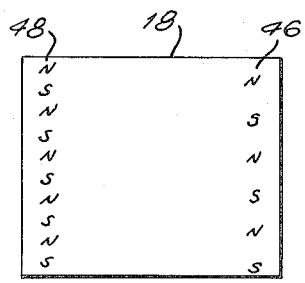
Fig. 3 is an idealized developed view of the rotor thereof showing a typical relationship between the magnetic poles formed on the two rotor sections.

The rotor comprises a cylinder 18 of any appropriately permanently magnetizable material mounted on a core 23 of aluminum or the like which is in turn made fast to rotor shaft 22. Rear and front ball bearings 24 and 26 respectively are mounted on the shaft 22 and are received within recesss 28 and 30 in the rear and front retaining caps 12 and 14 respectively. A washer 32 closes the opening 34 in the rear end retaining cap 12, and the bearing 24 rests thereagainst. A washer 36 surrounds the outwardly projecting portion of the rotor shaft 22 and thrusts against the bearing 26, a spring washer 38 and a second washer 40 fitting thereover and around the shaft 22 and being held in position by means of snap ring 42 received within undercut recesses 44 in the front end retaining cap 14. In the situation where the stator 2 is provided with six poles and the stator 4 is provided with ten poles, the poles of each stator being substantially uniformly disposed around the axis of the alternator, a typical relative positioning of the poles to be produced on the rotor cylinder 18 is shown in Fig. 3. It will be noted that none of the poles 46 cooperating with the stator 2 are necessarily in line with any of the poles 48 cooperating with the stator 4, but it is important to bear in mind that this does not mean that the voltage outputs from the coils 8 and 8' of the stators 2 and 4 respectively are out of phase. Depending upon the phase relationship of the outputs from the sections of the reference alternator and the steps employed in the magnetizing method hereinafter to be described, the outputs of the stators 2 and 4 may have any desired phase relationship, and that phase relationship may be reliably attained time and time on a production basis in one primary alternator after another.

Figure 1:
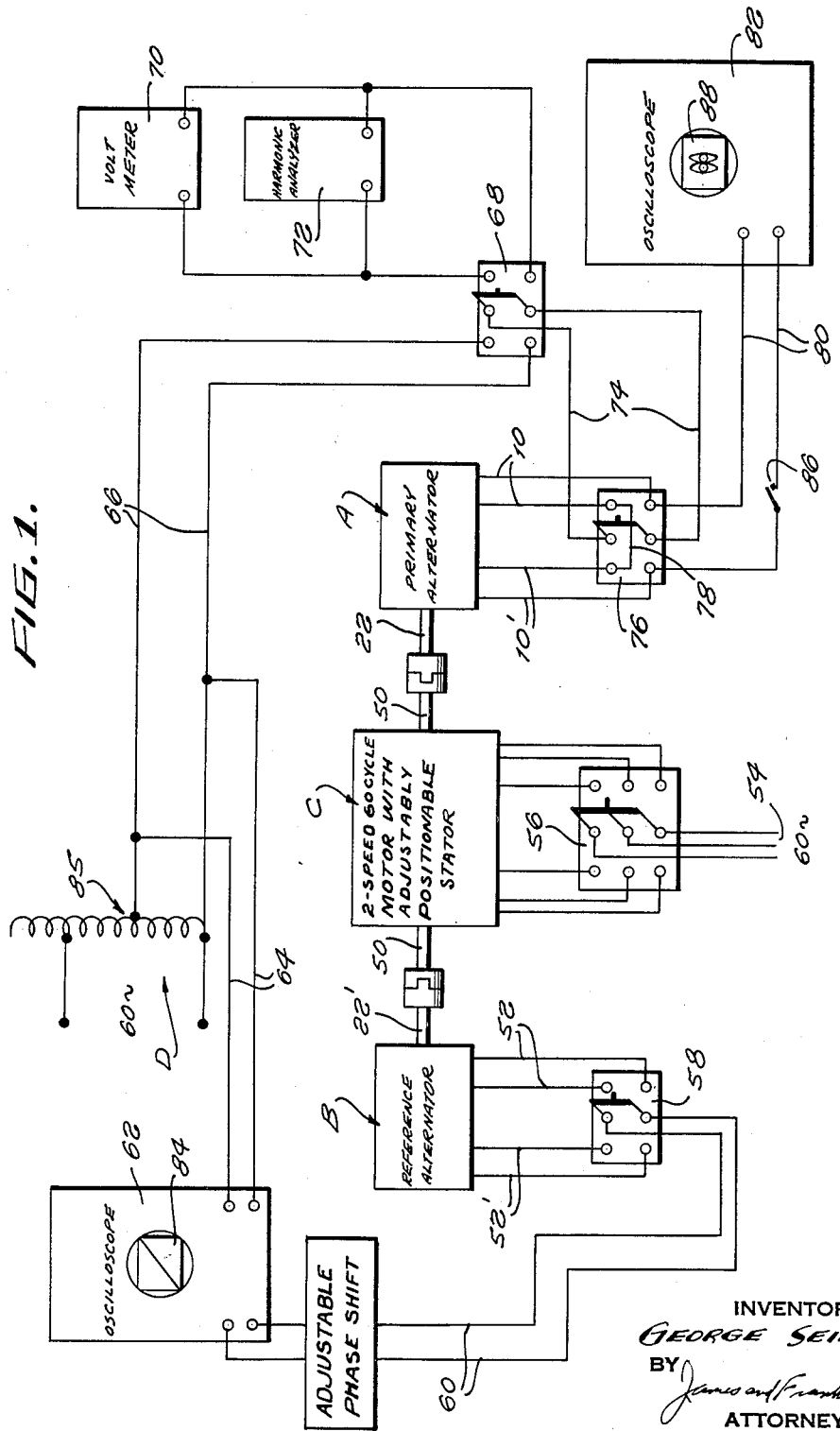
Fig. 1 is a diagrammatic view of an installation designed to facilitate the accomplishment of the instant invention.

Fig. 1 discloses an arrangement of instruments and electrical connections to facilitate carrying out the method of the present invention. That method will be specifically described in connection with a primary alternator the two stators of which have a different number of pole pieces, its two sections therefore producing outputs of different frequencies when the permanently magnetized rotor is driven at a given speed.

The rotor shaft 22 of the primary alternator A and the rotor shaft 22' of a reference alternator B are both rigidly connected to the output shaft 50 of a two-speed driving motor C. The reference alternator B is of the same type as the primary alternator A, that is to say, it has a two-section output, the leads carrying which are designated 52 and 52' respectively, the frequencies of those outputs having the same relationship to each other as do the frequencies of the outputs of the two sections of the primary alternator A on the leads 10 and 10' respectively, the phase relationship between the outputs of the two sections of the reference alternator B having that character which it is desired to attain in the primary alternator A, or having a known relation thereto.

When, as in the situation specifically under discussion, the outputs of the two sections of the alternators are to have different frequencies, the driving motor C is designed to be selectively driven at two different speeds corresponding to the frequencies of the outputs of the alternator sections, the speeds of operation of the motor C preferably being so selected that at each speed the output in the leads 52 or 52' of the reference alternator B are at a predetermined frequency, usually 60 cycles per second, corresponding to the frequency of a reference voltage generally designated D. According to the broader aspects of the invention, it is not necessary that the reference alternator output and the reference voltage D be at the same frequency, provided that the relationship between those frequencies is known, but from a practical point of view, and in order to facilitate the operations subsequently to be described, it is preferable that both frequencies be the same. For example, if one section of the reference alternator B should have 10 poles and if the other section should have six poles, the motor C will be driven at two speeds in the ratio of 6:10 in order for the outputs of the two reference alternator sections to have the same frequency during the magnetizing operations. As here disclosed, the motor C is of the dual-speed synchronous type operating from a 60 cycle per second three-phase voltage supply 54, a double throw switch 56 being utilized to selectively energize the motor C to operate at the speed desired.

A double throw switch 58 slectively connects the leads 52 or 52' from the two sections of the reference alternator B to the test leads 60 which, in the specific installation disclosed in Fig. 1, are connected to an oscilloscope 62 so as to energize one pair of opposed electrodes operative on the screen thereof, for example, the vertical plates. Another set of opposed oscilloscope electrodes, for example, the horizontal plates, are connected to the reference voltage C by means of leads 64. The reference voltage D is connected by leads 66 to one side of double throw switch 68. Connected to the other side of switch 68 is a voltmeter 70 and a harmonic analyzer 72. The central terminals of the switch 68 are connected by means of leads 74 to the central terminals of another double throw switch 76, the end terminals of which are connected respectively to the leads 10 and 10' from the two sections of the primary alternator A. Two of those end terminals, one on each pair, are connected together by means of lead 78, and the other two are connected by means of leads 80 to a second oscilloscope 82. A switch 86 is included in one of the leads 80.

The voltmeter 70, harmonic analyzer 72 and oscilloscope 82 are used for checking purposes, in order to test the results of the magnetizing process. The oscilloscope 62 functions as a means for measuring and indicating the phase difference between the reference voltage D and the output from a selected section of the reference alternator B. An oscilloscope is preferably employed for this purpose because it produces an easily readable indication of the phase relationship in question, and permits the duplication of that phase relationship speedily and with little margin for error, but according to the broader aspects of the present invention any other means for measuring and indicating phase differences could be employed.

The first step in the instant method is to throw the switch 56 so as to energize the driving motor C in such a way as to cause it to rotate the shafts 22 and 22' of the primary and reference alternator A and B respectively at a speed such that the output of the first section of the reference alternator B, on the leads 52, is at a predetermined frequency, for example, 60 cycles per second. The switch 58 is thrown to the right, thus connecting the leads 52 and 60 and energizing the vertical plates on the oscilloscope 62 with the 60 cycle output from the leads 52, the horizontal plates of the oscilloscope 62 being energized by a 60 cycle output from the reference voltage D by means of the leads 64. As a result a Lissajous pattern is obtained on the screen 84 of the oscilloscope 62, the shape of that pattern being determined by the phase difference between the reference voltage D and the output of the first reference alternator section.

As will be seen, at a later stage in the process it is desired to attain the same phase relationship between the reference voltage D and the output of the second section of the reference alternator B on the leads 52'. It would be possible to accomplish this by obtaining the same Lissajous pattern on the oscilloscope screen 84 in the latter case. However, since the particular shape of the Lissajous pattern derived from the output of the first reference alternator section is more or less haphazard, depending on the particular position which the rotor shaft 22' of the reference alternator B had when the motor C was energized, this would involve utilizing a different Lissajous pattern for each complete magnetizing procedure, and would represent a rather delicate matter of accurate reproduction in the second half of the process. It therefore is preferred to utilize the same pattern, and preferably a readily recognizable and reproducible one, for all operations and for all primary alternators which are to be similarly produced. One such pattern is a straight line at a 45 degree angle across the oscilloscope screen 84, as illustrated in Fig. 1. This relationship may be obtained, while the rotor of the reference alternator B is being rotated, by shifting its rotative position over and above its uniform rotation. This shift may be accomplished in a wide variety of ways, depending upon the type of equipment employed, but in the simplified setup here disclosed, in which the output shaft 50 of the driving motor C is rigidly coupled to the shafts 22 and 22' of the alternators A and B respectively, the phase shift of the output of the first section of the reference alternator B with respect to the reference voltage D is accomplished by rotatively shifting the stator of the motor C with respect to its base, thus carrying the rotor of the motor C around with it and hence adding an increment of rotation to the rotors of the alternators A and B. This rotative shifting of the stator of the motor C can readily be carried out until the desired pattern on the screen 84 of the oscilloscope 62 has been obtained.

With the phase relationship between the output of the first section of the reference alternator B relative to the reference voltage D having been thus determined and fixed, the first section 2 of the primary alternator A is now energized, as, for example, in the manner taught in Ross Patent 2,529,049. The switch 68 is thrown to the left, thus connecting the leads 66 and 74, the switch 86 is kept open, and the switch 76 is thrown to the right, thus connecting the leads 74 and 10 and energizing the stator coils 8 of the first section of the primary alternator A from the reference voltage D. The voltage applied to the stator coils 8 is varied from zero to a maximum and back to zero with a uniform motion, all while the permanently magnetizable rotor shell 18 is being driven in rotation by the motor C. The variation in applied voltage may be conveniently accomplished by means of a Variac 85 to which the reference voltage D is connected.

When this stator coil energizing procedure has been terminated, permanent magnet poles 46 will have been formed in the first section of the rotor shell 18 of the primary alternator A corresponding to the pole pieces 6 of the stator 2 corresponding thereto, and with all of the advantages of distortionless output and accurate registration which are inherent in that particular method of magnetization.

If it is desired to check the effectiveness of the magnetization, the switch 68 is thrown to the right, thus connecting the output leads 10 to the voltmeter 70 and harmonic analyzer 72. The voltmeter will indicate whether the permanent magnetic poles 46 formed by the magnetizing step are of proper strength to produce a voltage of desired magnitude at a given speed of rotor rotation, and the harmonic analyzer will indicate whether the voltage output is of satisfactorily distortionless shape. If the voltmeter shows an insufficient voltage, the switch 68 is thrown back to the left and the stator coil energizing step is repeated, the maximum voltage applied to the stator coils 8 being somewhat greater than before. If the voltmeter 70 indicates too great a value, the first section of the magnetizable rotor shell 18 is de-magnetized, as by applying voltage to the stator coils 8 as above while the rotor shaft 22 is oscillated back and forth by hand, after which the magnetizing procedure is carried out again from the beginning, the maximum voltage applied to the stator coils 8 during the energizing step being somewhat less than that which was previously applied. If the harmonic analyzer 72 should indicate an excessive amount of distortion, the rotor may be demagnetized as just described and then remagnetized again in a different rotative position. This may be accomplished either by shifting the rotor shaft 22 of the primary alternator A relative to the rotor shaft 22' of the reference alternator B through any appropriate coupling mechanism, by carrying out the magnetizing process again, attaining a different pattern on the screen of the oscilloscope 62, or, preferably, by utilizing the same readily recognizable and reproducible pattern on the oscilloscope screen but introducing a phase shift into the output of the first section of the reference alternator B before it reaches the oscilloscope 62, as by inserting a suitably computed phase shifting network into the lines 60.

After magnetization of the first section of the primary alternator A has been achieved, the switch 56 is thrown to its other closed position, thus energizing the motor C so as to drive it at a speed such that the rotor of the reference alternator B generates a voltage in the second section of the reference alternator B, on the leads 52', having the same frequency as before, e. g. 60 C. P. S. The switch 58 is thrown to the left, thus connecting the output of the second reference alternator section to the oscilloscope 62. Then the phase of the output of the second reference alternator section relative to the reference voltage D is caused to compare in a desired manner with that obtained with the first section of the reference alternator, and is preferably, for reasons of uniformity and ease of manipulation, caused to assume the same phase relationship, care being taken that any rotational increments applied to the shaft 22' of the reference alternator B in order to bring about this phase relationship are also and equally applied to the shaft 22 of the primary alternator A. This can be accomplished in numerous ways, but, as before, it has been found most convenient to rotatively shift the stator of the driving motor C relative to its base, the motor shaft 50 being rigidly coupled to the shafts 22 and 22'.

Once this desired phase relationship has been obtained, the second section 4 of the primary alternator A may be magnetized in a manner similar to that employed with the first section 2, the switch 76 being thrown to the left in order to connect the leads 10' with the leads 66 and 74, the voltage applied to the stator coils 8' of the second section 4 of the primary alternator A being varied from zero from maximum and back to zero as before.

Thereafter, the magnetization of the second section 4 of the primary alternator A may be checked by throwing the switch 68 to the right and observing the voltmeter 70 and harmonic analyzer 72, appropriate action being taken in response to the readings of those instruments as previously described.

Because the phase relationship between the outputs of the two sections of the reference alternator B represent the standard, attainment of which is desired in the primary alternator A, or bears some fixed relation thereto, and because the actual position of the residual magnetic poles 46 and 48 on the two sections of the rotor cylinder 18 in the primary alternator A relative to their respective stators correspond to that in the reference alternator A, exactly the same phase relation between the outputs of the primary alternator A should theoretically result as obtains between the outputs of the two sections of the reference alternator B.

This may readily be checked by connecting the two outputs of the primary alternator A in series, via the leads 80, to an oscilloscope 82. When this composite signal is applied to the vertical plates of the oscilloscope 82 by closing switch 86 and a reference signal, such as the usual sweep signal having a variable frequency, is applied to the horizontal plates thereof, a butterfly pattern will be obtained on the screen 88 thereof, that pattern indicating by its shape the phase relationship between the outputs of the two sections of the primary alternator A.

When, as is usually the case, it is desired that the voltages of both outputs should reach zero at the same instant on their way to a positive maximum, even though the voltages are at different frequencies, a very effective indication of the achievement of this result can be obtained by varying the sweep frequency until a stable butterfly pattern is obtained which, as shown in Fig. 1, consists of two pairs of inner and outer loops, then increasing the vertical gain until the inner loops fill the screen vertically, and then decreasing the horizontal gain until the inner loops merge into a straight line. If the two outputs have the desired phase relationship as above set forth, the peaks of the two inner loops will coincide. This method of indication is so effective that even when some other phase relationship between the two outputs is desired, it is preferred to utilize this indication to determine whether that phase shift network being interposed in the lines 80 to compensate for the departure of the phase relationship between the outputs in the particular case from that phase relationship in which the two voltages simultaneously reach zero on their way to a positive maximum.

In actual practice it has been found that there are unavoidable differences between individual primary alternators, even though they all be of the same design, and that compensation must be made for these differences. The air gaps between stators and rotors may vary from one alternator to another and the homogeneity of the iron in the magnetic circuits of the alternators may vary. In addition in general, within a given dual section alternator, the two stator sections will have windings of different impedance. Because of these and other factors, the impedances of the overall electromagnetic circuits of the alternator sections will not be identical. As a result, even though the identical voltage may be applied to the stator windings 8 and 8' of individual alternators, the actual energizing effects of those voltages will differ. Hence, when the above procedure is carried out, it usually occurs that the phase relationships between the voltage outputs of the two sections of the primary alternator, when checked on the oscilloscope 82, are not exactly as desired. The degree of departure of the phase relationship from its desired value will be indicated by the lack of coincidence of the peaks of the inner loops visible on the oscilloscope screen 88. Once the magnetizing procedure has been carried out as described above, the operator will note the degree of divergence of the inner peaks on the oscilloscope screen 88, and he may then compensate therefor by inserting an appropriate amount of phase shift into the line 60 between the output of the second section of the reference alternator B and the oscilloscope 62, the frame of the motor C being again shifted until the diagonal straight line pattern is observed on the screen 84 of the oscilloscope 62, after which the second section of the primary alternator A is re-magnetized. The phase relationship between the outputs of the two sections of the primary alternator A are again checked on the oscilloscope 82, further adjustment in the amount of phase shift inserted between the second section of the reference alternator B and the oscilloscope 62 is made if necessary, the straight line pattern on the oscilloscope screen 84 is again obtained, the second section of the primary alternator A is again magnetized, and this empirical procedure is continued until the proper phase relationship between the outputs of the two sections of the primary alternator A is attained. It has been found from actual experience on production lines that an operator learns to gauge the proper amount of phase shift to be inserted to compensate for a given observed departure of the phase relationship of the two sections of the primary alternators, so that the testing procedure even with this empirical variation to compensate for individual differences between primary alternators is entirely practical, and represents a marked advance from insofar as speed and overall cost is concerned, over previously known procedures involving actual physical positioning of the individual stators.

In the immediately preceding paragraph no reference has been specifically made to the de-magnetization of the second section of the rotor 18 of the primary alternator A between the successive magnetizations and re-magnetizations thereof. It has been found that in many alternator designs the re-magnetization step, in and of itself, destroys the previous magnetizations. In those cases where this does not obtain, of course, it will be necessary to demagnetize the rotor section by a separate operation, such as one of those specifically described above in conjunction with the checking of the magnitude of the magnetization of the first section of the primary alternator A.

The phase shifting has been above described as accomplished in the line 60. From a production point of view this is preferred, but it will be appreciated that the same end result would be obtained if, for example, the phase shifting were done in the lines 66 or 74 during the magnetizing of the appropriate section of the rotor 18 of the primary alternator A, thus causing the energizing and magnetizing voltage to differ in phase from the reference voltage.

In general it does not matter which of the two sections of the alternators are magnetized first. Howev, it may well occur, because of the peculiar geometry of a particular motor assembly, that one of the sections is more susceptible to harmonics than the other. In such a case that section which is more susceptible to harmonics should be magnetized first, in order that the particular rotative position of the rotor section relative to its corresponding stator which will produce the least distortion can be utilized for magnetization purposes. Once one section of the alternator has been magnetized, no leeway is permitted in the relative rotative position of the second section when it is magnetized if the desired phase relationship between the outputs is to be achieved.

In some situations it has been found that distortion of output is best minimized by forcing the rotor of the primary alternator out of synchronism and letting it come into synchronism while the stator coils 8 of the appropriate stator section are energized. In this way that rotative position of the rotor which gives the least distortion can be determined in a relatively short time. This involves, however, a rotative shift from that position indicated by the reference alternator B. Hence, if the actual stator coil energizing step was started when the pattern on the oscilloscope 62 was a straight line, it will be completed and the first section of the primary alternator A will be energized for least distortion. Accordingly, a variable phase shift network may be inserted into the lines 60 so that, after the first section of the primary alternator A has been magnetized in such a way as to minimize distortion, the image on the screen of the oscilloscope 62 can then be brought to the straight line configuration, to be matched in the second half of the process with the same artificial phase shift before the second section of the rotor of the primary alternator A is magnetized.

It will be apparent that through the use of the present invention a two-section alternator the stators 2 and 4 of the respective sections of which have a random relative rotative relationship in the motor casing may be magnetized accurately, efficiently and rapidly so that the outputs of the individual sections have the desired characteristics as to voltage, frequency and phase relationship, as well as having a minimal degree of distortion, and without requiring any mechanical adjustments of the alternator itself. Moreover, through the use of an installation of the type here specifically disclosed, a procedure has been developed which is tailormade to the needs of a production line, since the operations are standardized, the testing indications are readily recognizable and reproducible, and the entire system can be operated by semi-skilled personnel.

While but a single embodiment of the present invention has been here disclosed, it will be apparent that many variations may be made therein, all within the scope of the instant invention as defined in the following claims.

I claim:

1. The method of magnetizing a two-section permanent magnet alternator having two sets of stator coils for producing, when energized, individual magnetic fields, and a permanent magnet rotor having separate sections cooperable respectively with each of said individual magnetic fields, said method comprising drivingly connecting the rotor of said primary alternator to be magnetized and the rotor of a reference alternator to a driving means, energizing said driving means and causing it to drive said rotors at a first speed such that the output of the first section of said reference alternator is at a predetermined frequency, determining the phase relationship between the voltage output of said first section of said reference alternator and a reference voltage, energizing the first set of stator coils of said primary alternator, corresponding to said first section of said reference alternator, so as to magnetize that section of the permanent magnet which cooperates therewith, energizing said driving means so as to rotate said rotors at a speed such that the voltage output of the second section of said reference alternator is at a predetermined frequency, determining the phase relationship between the voltage output of said second section of said reference alternator and said reference voltage, shifting the driving connection between said rotors and said driving means until a phase relationship is obtained which compares in a desired manner with that obtained with said first section of said reference alternator, and then energizing the second set of stator coils of said primary alternator, corresponding to said second section of said reference alternators, so as to magnetize that section of the permanent magnet rotor which cooperates therewith.

2. The method of magnetizing a two-section permanent magnet alternator having two sets of stator coils for producing, when energized, individual magnetic fields, and a permanent magnet rotor having separate sections cooperable respectively with each of said individual magnetic fields, said method comprising drivingly connecting the rotor of said primary alternator to be magnetized and the rotor of a reference alternator to a driving means, energizing said driving means and causing it to drive said rotors at a first speed such that the output of the first section of said reference alternator is at a predetermined frequency, determining the phase relationship between the voltage output of said first section of said reference alternator and a reference voltage by obtaining a pattern on an oscilloscope to which said voltage output and said reference voltage are fed, energizing the first set of stator coils of said primary alternator, corresponding to said first section of said reference alternator, so as to magnetize that section of the permanent magnet which cooperates therewith, energizing said driving means so as to rotate said rotors at a speed such that the voltage output of the second section of said reference alternator is at a predetermined frequency, determining the phase relationship between the voltage output of said second section of said reference alternator and said reference voltage by obtaining a pattern on an oscilloscope to which said voltage output and said reference voltage are fed, shifting the driving connection between said rotors and said driving means until the same pattern is obtained on said oscilloscope as was the case with the first section of said reference alternator, thus indicating that the same phase relationship has been obtained as with said first section of said reference alternator, and then energizing the second set of stator coils of said primary alternator, corresponding to said second section of said reference alternator, so as to magnetize that section of the permanent magnet rotor which cooperates therewith.

3. The method of claim 2, in which an adjustable amount of phase shift is introduced between the voltage output of the second section of said reference alternator and said oscilloscope to compensate for variations between individual primary alternators.

4. The method of magnetizing a two-section permanent magnet alternator having two sets of stator coils for producing, when energized, individual magnetic fields, and a permanent magnet rotor having separate sections cooperable respectively with each of said individual magnetic fields, said method comprising drivingly connecting the rotor of said primary alternator to be magnetized and the rotor of a reference alternator to a driving means, energizing said driving means and causing it to drive said rotors at a first speed such that the output of the first section of said reference alternator is at a predetermined frequency, determining the phase relationship between the voltage output of said first section of said reference alternator and a reference voltage by obtaining a pattern on an oscilloscope to which said voltage output and said reference voltage are fed, shifting the driving connection between said reference alternator rotor and said driving means until a predetermined phase relationship is obtained as indicated by the presence of a predetermined pattern on said oscilloscope, energizing the first set of stator coils of said primary alternator, corresponding to said first section of said reference alternator, so as to magnetize that section of the permanent magnet which cooperates therewith, energizing said driving means so as to rotate said rotors at a speed such that the voltage output of the second section of said reference alternator is at a predetermined frequency, determining the phase relationship between the voltage output of said second section of said reference alternator and said reference voltage by obtaining a pattern on an oscilloscope to which said voltage output and said reference voltage are fed, shifting the driving connection between said rotors and said driving means until said predetermined pattern is obtained on said oscilloscope, thus indicating that the same phase relationship has been obtained as with said first section of said reference alternator, and then energizing the second set of stator coils of said primary alternator, corresponding to said second section of said reference alternator, so as to magnetize that section of the permanent magnet rotor which cooperates therewith.

5. The method of magnetizing a two-section permanent magnet alternator having two sets of stator coils for producing, when energized, individual magnetic fields, and a permanent magnet rotor having separate sections cooperable respectively with each of said individual magnetic fields, said method comprising drivingly connecting the rotor of said primary alternator to be magnetized and the rotor of a reference alternator to a driving means, energizing said driving means and causing it to drive said rotors at a first speed such that the output of the first section of said reference alternator is at a predetermined frequency, determining the phase relationship between the voltage output of said first section of said reference alternator and a reference voltage having said predetermined frequency, shifting the driving connection between said reference alternator rotor and said driving means until a predetermined phase relationship is obtained, energizing the first set of stator coils of said primary alternator, corresponding to said first section of said reference alternator, by said reference voltage so as to magnetize that section of the permanent magnet which cooperates therewith, energizing said driven means so as to rotate said rotors at a speed such that the voltage output of the second section of said reference alternator is at said predetermined frequency, determining the phase relationship between the voltage output of said second section of said reference alternator and said reference voltage, shifting the driving connection between said rotors and said driving means until the same phase relationship is obtained as with said first section of said reference alternator, and then energizing the second set of stator coils of said primary alternator, corresponding to said second section of said reference alternator, by said reference voltage so as to magnetize that section of the permanent magnet rotor which cooperates therewith.

6. The method of claim 5, in which an adjustable amount of phase shift is introduced between the voltage output of the second section of said reference alternator and said oscilloscope to compensate for variations between individual primary alternators.

7. The method of claim 1, in which said driving means comprises a rotor and a stator, the driving connecting between said driving means and said alternator rotors being shifted by rotatively shifting the stator of the driving means relative to its base.

8. The method of claim 2, in which said driving means comprising a rotor and a stator, the driving connection between said driving means and said alternator rotors being shifted by rotatively shifting the stator of the driving means relative to its base.

9. The method of claim 4, in which said driving means comprises a rotor and a stator, the driving connection between said driving means and said alternator rotors being shifted by rotatively shifting the stator of the driving means relative to its base.

10. The method of claim 5, in which said driving means comprising a rotor and a stator, the driving connection between said driving means and said alternator rotors being shifted by rotatively shifting the stator of the driving means relative to its base.

11. The method of magnetizing a two-section dual frequency permanent magnet alternator having two sets of stator coils, one for each frequency, each producing, when energized, an individual magnetic field and a permanent magnet rotor having separate sections cooperable respectively with each of said individual magnetic fields, said method comprising drivingly connecting the rotor of said primary alternator to be magnetized and the rotor of a two-section reference alternator to a driving means, energizing said driving means and causing it to drive said rotors at a first speed such that the output of the first section of said reference alternator is at a predetermined frequency, determining the phase relationship between the voltage output of said first section of said reference alternator and a reference voltage, energizing the first set of stator coils of said primary alternator, corresponding to said first section of said reference alternator, so as to magnetize that section of the permanent magnet which cooperates therewith, energizing said driving means so as to rotate said rotors at a speed such that the voltage output of the second section of said reference alternator is at said predetermined frequency, determining the phase relationship between the voltage output of said second section of said reference alternator and said reference voltage, shifting the driving connection between said rotors and said driving means until a phase relationship is obtained which compares in a desired manner with said first section of said reference alternator and then energizing the second set of stator coils of said primary alternator, corresponding to said second section of said reference alternator, so as to magnetize that section of the permanent magnet rotor which cooperates therewith.

12. The method of magnetizing a two-section dual frequency permanent magnet alternator having two sets of stator coils, one for each frequency, each producing, when energized, an individual magnetic field and a permanent magnet rotor having separate sections cooperable respectively with each of said individual magnetic fields, said method comprising drivingly connecting the rotor of said primary alternator to be magnetized and the rotor of a two-section reference alternator to a driving means, energizing said driving means and causing it to drive said motors at a first speed such that the output of the first section of said reference alternator is at a predetermined frequency, determining the phase relationship between the voltage output of said first section of said reference alternator and a reference voltage by obtaining a pattern on an oscilloscope to which said voltage output and said reference voltage are fed, energizing the first set of stator coils of said primary alternator, corresponding to said first section of said reference alternator, so as to magnetize that section of the permanent magnet which cooperates therewith, energizing said driving means so as to rotate said rotors at a speed such that the voltage output of the second section of said reference alternator is at said predetermined frequency, determining the phase relationship between the voltage output of said second section of said reference alternator and said reference voltage by obtaining a pattern on an oscilloscope to which said voltage output and said reference voltage are fed, shifting the driving connection between said rotors and said driving means until the same pattern is obtained on said oscilloscope as was the case with the first section of said reference alternator, thus indicating that the same phase relationship has been obtained as with said first section of said reference alternator, and then energizing the second set of stator coils of said primary alternator, corresponding to said second section of said reference alternator, so as to magnetize that section of the permanent magnet rotor which cooperates therewith.

13. The method of claim 12, in which an adjustable amount of phase shift is introduced between the voltage output of the second section of said reference alternator and said oscilloscope to compensate for variations between individual primary alternators.

14. The method of magnetizing a two-section dual frequency permanent magnet alternator having two sets of stator coils, one for each frequency, each producing, when energized, an individual magnetic field and a permanent magnet rotor having separate sections cooperable respectively with each of said individual magnetic fields, said method comprising drivingly connecting the rotor of said primary alternator to be magnetized and the rotor of a two-section reference alternator to a driving means, energizing said driving means and causing it to drive said motors at a first speed such that the output of the first section of said reference alternator is at a predetermined frequency, determining the phase relationship between the voltage output of said first section of said reference alternator and a reference voltage by obtaining a pattern on an oscilloscope to which said voltage output and said reference voltage are fed, shifting the driving connection between said reference alternator rotor and said driving means until a predetermined phase relationship is obtained as indicated by the presence of a predetermined pattern on said oscilloscope, energizing the first set of stator coils of said primary alternator, corresponding to said first section of said reference alternator, so as to magnetize that section of the permanent magnet which cooperates therewith, energizing said driving means so as to rotate said rotors at a speed such that the voltage output of the second section of said reference alternator is at said predetermined frequency, determining the phase relationship between the voltage output of said second section of said reference alternator and said reference voltage by obtaining a pattern on an oscilloscope to which said voltage output and said reference voltage are fed, shifting the driving connection between said rotors and said driving means until the same pattern is obtained on said oscilloscope as was the case with the first section of said reference alternator, thus indicating that the same phase relationship has been obtained as with said first section, and then energizing the second set of stator coils of said primary alternator, corresponding to said second section of said reference alternator, so as to magnetize that section of the permanent magnet rotor which cooperates therewith.

15. The method of magnetizing a two-section due frequency premanent magnet alternator having two set of stator coils, one for each frequency, each producing, when energized, an individual magnetic field and a permanent magnet rotor having separate sections cooperable respectively with each of said individual magnetic fields, said method comprising drivingly connecting the rotor of said primary alternator to be magnetized and the rotor of a two-section reference alternator to a driving means, energizing said driving means and causing it to drive said rotors at a first speed such that the output of the first section of said reference alternator is at a predetermined frequency, determining the phase relationship between the voltage output of said first section of said reference alternator and a reference voltage having said predetermined frequency, shifting the driving connection between said reference alternator rotor and said driving means until a predetermined phase relationship is obtained, energizing the first set of stator coils of said primary alternator, corresponding to said first section of said reference alternator, by said reference voltage so as to magnetize that section of the permanent magnet which cooperates therewith, energizing said driving means so as to rotate said rotors at a speed such that the voltage output of the second section of said reference alternator is at said predetermined frequency, determining the phase relationship between the voltage output of said second section of said reference alternator and said reference voltage, shifting the driving connection between said rotors and said driving means until the same phase relationship is obtained as with said first section, and then energizing the second set of stator coils of said primary alternator, corresponding to said second section of said primary alternator, by said reference voltage so as to magnetize that section of the permanent magnet rotor which cooperates therewith.

16. The method of claim 15, in which an adjustable amount of phase shift is introduced between the voltage output of the second section of said reference alternator and said oscilloscope to compensate for variations between individual primary alternators.

17. The method of claim 11, in which said driving means comprises a rotor and a stator, the driving connection between said driving means and said alternator rotors being shifted by rotatively shifting the stator of the driving means relative to its base.

18. The method of claim 12, in which said driving means comprises a rotor and a stator, the driving connection between said driving means and said alternator rotors being shifted by rotatively shifting the stator of the driving means relative to its base.

19. The method of claim 14, in which said driving means comprises a rotor and a stator, the driving connection between said driving means and said alternator rotors being shifted by rotatively shifting the stator of the driving means relative to its base.

20. The method of claim 15, in which said driving means comprising a rotor and a stator, the driving connection between said driving means and said alternator rotors being shifted by rotatively shifting the stator of the driving means relative to its base.

21. In the method of claim 2, where a predetermined phase difference is desired between the voltages of the first and second sets of stator coils of the primary alternator, providing an appropriately computed phase shift network between said oscilloscope and one section of said primary alternator, said network being so designed as to produce a phase change in the voltage output of said one reference alternator section corresponding to the predetermined phase difference desired between the outputs of said sets of stator coils of said primary alternator.

22. In the method of claim 2, checking the phasing of the outputs of said sets of primary alternator stator coils by feeding the outputs of both of said sets of coils to the same electrodes of an oscilloscope, varying the sweep frequency until a butterfly pattern is produced on the oscilloscope screen having inner and outer loops, increasing the gain applied to said first set of electrodes until the inner loops fill the screen, and then decreasing the gain applied to said other set of electrodes until the two loops merge, the relative positions of the peaks of those two loops indicating the phase relationship between the voltage outputs from the two sets of primary alternator stator coils.

23. In the method of claim 12, checking the phasing of the outputs of said sets of primary alternator stator coils by feeding the outputs of both of said sets of coils to the same biasing electrodes of an oscilloscope, varying the sweep frequency applied to the set of biasing electrodes in said oscilloscope disposed at right angles to said first set until a butterfly pattern is produced on the oscilloscope screen having inner and outer loops, increasing the gain applied to said first set of electrodes until the inner loops fill the screen, and then decreasing the gain applied to said other set of electrodes until the two loops, merge, the relative positions of the peaks of those two loops indicating the phase relationship between the voltage outputs from the two sets of primary alternator stator coils.

References Cited in the file of this patent

UNITED STATES PATENTS 1,144,012 Walton _____ June 22, 1915